(12) United States Patent
Nagao

(10) Patent No.: US 10,667,132 B2
(45) Date of Patent: May 26, 2020

(54) MOBILE DEVICE NETWORK AUTHENTICATION SYSTEMS AND METHODS

(71) Applicant: Intertrust Technologies Corporation, Sunnyvale, CA (US)

(72) Inventor: Yutaka Nagao, San Jose, CA (US)

(73) Assignee: Intertrust Technologies Corporation, Sunnyvale, CA (US)

( * ) Notice: Subject to any disclaimer, the term of this patent is extended or adjusted under 35 U.S.C. 154(b) by 0 days.

(21) Appl. No.: 16/508,245

(22) Filed: Jul. 10, 2019

(65) Prior Publication Data

US 2020/0021984 A1   Jan. 16, 2020

Related U.S. Application Data

(60) Provisional application No. 62/696,585, filed on Jul. 11, 2018.

(51) Int. Cl.
*H04W 12/06* (2009.01)
*H04W 48/18* (2009.01)

(52) U.S. Cl.
CPC .......... *H04W 12/06* (2013.01); *H04W 48/18* (2013.01)

(58) Field of Classification Search
CPC .............................. H04W 12/06; H04W 48/18
See application file for complete search history.

(56) References Cited

U.S. PATENT DOCUMENTS

| | | | | |
|---|---|---|---|---|
| 2012/0264425 A1* | 10/2012 | Krishnamoorthy | ... | H04W 48/16 455/434 |
| 2012/0309344 A1* | 12/2012 | Ferrazzini | ......... | H04M 1/72519 455/406 |
| 2014/0364118 A1* | 12/2014 | Belghoul | .............. | H04W 68/12 455/435.1 |
| 2015/0327207 A1* | 11/2015 | Bharadwaj | .............. | H04W 8/04 455/435.2 |
| 2016/0374014 A1* | 12/2016 | Anyuru | ............... | H04L 63/0853 |
| 2017/0026825 A1* | 1/2017 | Yang | ..................... | H04W 8/183 |
| 2017/0127217 A1* | 5/2017 | Miao | ..................... | H04W 76/10 |
| 2017/0156050 A1* | 6/2017 | Khairmode | ........... | H04W 76/18 |
| 2019/0159116 A1* | 5/2019 | Guan | .................... | H04W 8/186 |

* cited by examiner

*Primary Examiner* — Nizar N Sivji
(74) *Attorney, Agent, or Firm* — Thayne and Davis LLC; John P. Davis

(57) ABSTRACT

This disclosure relates to systems and methods for managing mobile device network access. Systems and methods are described that allow for a mobile device to identify and selectively authenticate with one of a plurality of mobile network operators based on one or more policies associated with the mobile device and/or its user. Based on one or more policies, the mobile device may determine that a particular network is a preferred network and used provisioned electronic subscriber information stored on the device associated with the preferred network to connect to the preferred network. In various embodiments, other available networks may be checked, and the mobile device may switch networks in the event a new preferred network is identified.

14 Claims, 5 Drawing Sheets

Mobile Network Connection Policies – 110

*Geographic-Based Policy – 208*
- Connect to MNO 1 when device is located within first area
- Connect to MVO 2 when device is located within second area

*Connection-Based Policy – 300*
- Connect to available MNO with fastest download bandwidth
- Connect to available MNO with fastest upload bandwidth

*Cost-Based Policy – 212*
- Connect to available MNO with least expensive voice rates
- Connect to available MNO with least expensive data rates
- Connect to available MNO with least expensive combined voice/data rates

*Temporal-Based Policy – 302*
- Connect to MNO 1 during first time window
- Connect to MNO 2 during second time window
- Connect to MNO 1 until expiration of a first period of time

*Operator-Based Policy – 210*
- Connect to MNO 2 if available

Figure 3

MOBILE DEVICE NETWORK AUTHENTICATION SYSTEMS AND METHODS

RELATED APPLICATION

This application claims the benefit of priority under 35 U.S.C. § 119(e) to U.S. Provisional Patent Application No. 62/696,585, filed Jul. 11, 2018, and entitled "MOBILE DEVICE NETWORK AUTHENTICATION SYSTEMS AND METHODS," the content of which is hereby incorporated by reference in its entirety.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

SUMMARY

The present disclosure relates generally to systems and methods for authenticating mobile devices. More specifically, but not exclusively, the present disclosure relates to systems and methods for authenticating a mobile device with one or more mobile network carriers and/or operators.

Mobile devices, including mobile phones, tablets, and/or computers, may use specialized integrated circuits, which may be referred to as a subscriber identity module and/or subscriber identification module ("SIM"), to store certain identification and/or key information used in connection with authenticating subscribers with service provider networks. For example, a SIM card may securely store an international mobile subscriber identity ("IMSI") number and/or an associated authentication key that may be used to identify and authenticate subscribers on a network. Including specialized hardware in mobile devices designed to interface with SIM cards, however, may be associated with certain drawbacks including challenges in accommodating the space required by the specialized device hardware and/or reduced user and/or network operator flexibility as SIM cards may be bound to a particular carrier.

In various embodiments, software-based SIM implementations, which may be referred to as e-SIM implementations, may address some of these challenges. For example, software SIM implementations may not be bound to a particular carrier, and may further alleviate device space constraints associated with specialized SIM-interfacing hardware.

Embodiments disclosed herein may provide for an architecture that allows for a mobile device to identify and selectively connect to one of a plurality of mobile network operators ("MNOs") based on one or more policies associated with the mobile device and/or its user. For example, in some embodiments, an application executing on a mobile device may periodically check and/or otherwise determine the speed and/or bandwidth availability of networks associated with one or more MNOs. The application may, based on one or more policies, determine that a particular network is a preferred network by comparing the measured speed and/or bandwidth availability of the one or more networks. A variety of other policies may also be used to identify preferred networks consistent with various aspects of the disclosed embodiments.

The mobile device may utilize e-SIM information stored on the device associated with the preferred network to connect to the preferred network. In various embodiments, other available networks may be checked (e.g., checked periodically, in response to received contextual information indicative of the occurrence of one or more events, user input, device sensor information, etc.), and the mobile device may switch networks in the event a new preferred network is identified.

BRIEF DESCRIPTION OF THE DRAWINGS

The inventive body of work will be readily understood by referring to the following detailed description in conjunction with the accompanying drawings, in which:

FIG. 3 illustrates an example of mobile network connection policies consistent with certain embodiments of the present disclosure.

DETAILED DESCRIPTION

Figure 1:
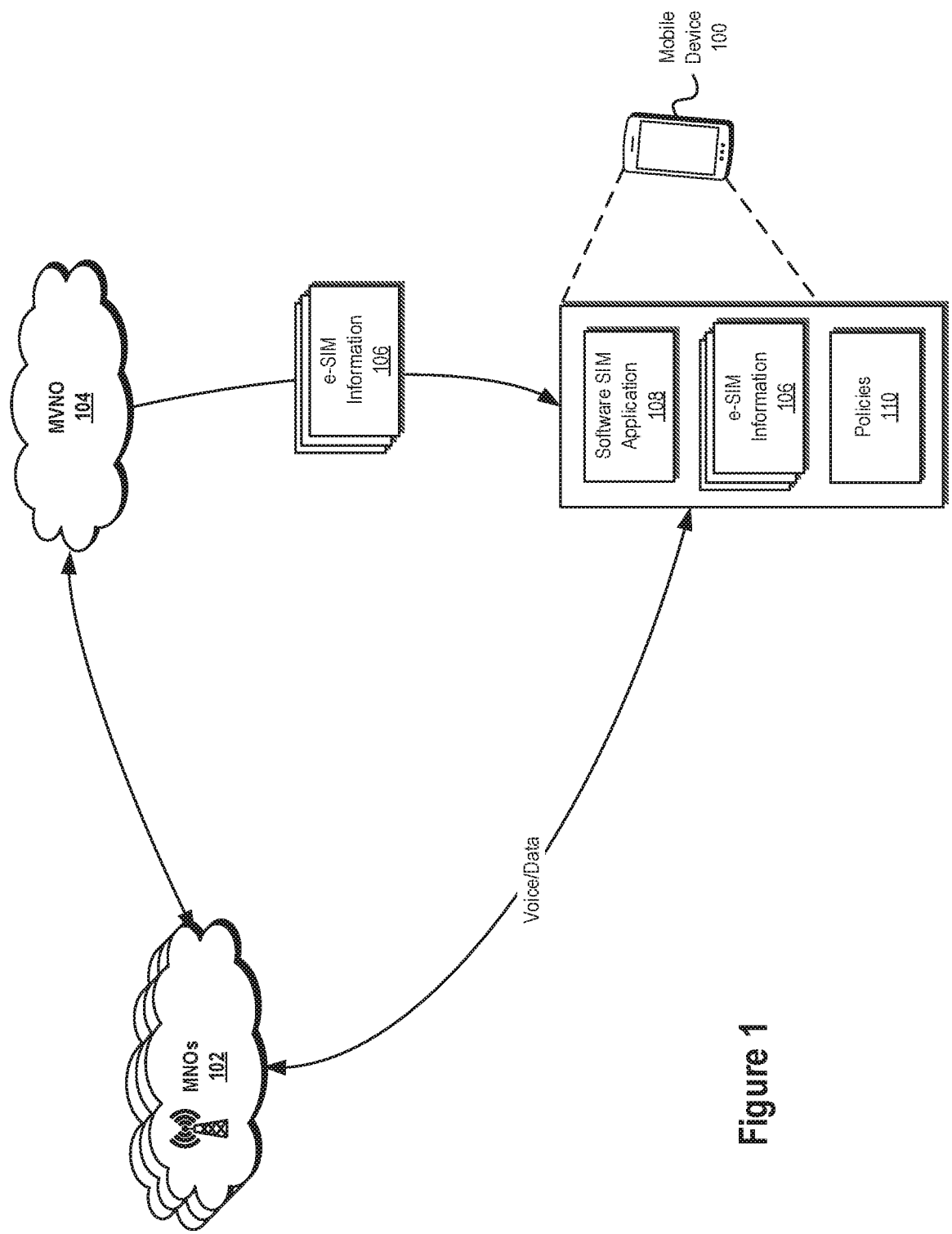
FIG. 1 illustrates an example of an architecture for connecting a mobile device with one or more mobile networks consistent with certain embodiments of the present disclosure.

A description of the systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be understood by reference to the drawings, wherein like parts may in some instances be designated by like numbers or descriptions. The components of the disclosed embodiments, as generally described and/or illustrated in the figures herein, could be arranged and designed in a wide variety of different configurations. Thus, the following description of the embodiments of the systems and methods of the disclosure is not intended to limit the scope of the disclosure but is merely representative of possible embodiments of the disclosure. In addition, the steps of any method disclosed herein do not necessarily need to be executed in any specific order, or even sequentially, nor need the steps be executed only once, unless otherwise specified.

A mobile virtual network operator ("MVNO") may be an intermediary between a mobile subscriber and a mobile network operator ("MNO"). The MVNO may contract with the MNO to use their mobile network infrastructure. For example, an MVNO and MNO may establish a business relationship that articulates, among other things, an amount the MVNO will pay to use the network infrastructure of the MNO.

An MVNO may provide its mobile subscribers with activation information (e.g., via a SIM card and/or e-SIM information) that may allow the subscriber to connect to the network of a particular MNO. Activation information may be associated with and/or otherwise bound to a particular MNO. For example, a physical SIM card provided to a subscriber by an MVNO may be bound to a particular MNO.

Consistent with embodiments disclosed herein, a software-based SIM implementation may be capable of using e-SIM information provisioned to a subscriber to authenticate the subscriber with and connect to a particular MNO. Different e-SIM information provisioned to the subscriber may be used to authenticate the subscriber with and/or connect to different MNOs. In this manner, software-based SIM implementations may not be bound to a particular carrier. This may allow a subscriber to more readily transition between different MNOs without necessarily having to switch between different physical SIM cards in their mobile devices.

Mobile devices are increasingly being used to consume a variety of media content including videos, music, and/or game content. The consumption of media content, however, may cause mobile communication networks to become congested and/or otherwise bandwidth constrained due to the demand for network bandwidth outpacing improvements and/or enhancements to mobile network infrastructure.

Additionally, available mobile network bandwidth and/or speed may vary between MNOs and/or the location of a particular subscriber device. For example, a first MNO may provide a relatively higher speed connection at a subscriber's home, whereas a second MNO may provide a relatively higher speed connection at a subscriber's place of work.

Embodiments disclosed herein may provide for an architecture that allows for a subscriber device to identify and selectively connect to one of a plurality of MNOs based on one or more policies associated with the mobile device and/or its subscriber. A variety of policies may be used to select which MNO of a plurality of available MNOs is a preferred MNO including, for example and without limitation, geographic-based policies, connection-based policies, cost-based policies, temporal-based policies, and/or network operator-based policies. Consistent with various disclosed embodiments, a mobile device may be provisioned with subscriber identification information associated with a plurality of MNOs such as, for example, e-SIM information, and may use the provisioned identification information to switch been between MNOs in accordance with specified policy, thereby improving the experience of the subscriber.

FIG. 1 illustrates an example of an architecture for connecting a mobile device 100 with one or more mobile networks consistent with certain embodiments of the present disclosure. Specifically, the illustrated architecture may allow for a mobile device 100 provisioned with subscriber identification information 106, that in some embodiments may comprise e-SIM information, to connect with one or more networks associated with one or move available MNOs 102 in accordance with applicable policies 110.

In various embodiments, a subscriber may be associated with a mobile device 100. The subscriber may comprise and/or an individual user of the device 100 and/or any other individual and/or entity that may subscribe to mobile network service via a MVNO 104 and/or an MNO 102. In certain embodiments, the device 100 may comprise at least one of a smartphone, an electronic book, a smartwatch, a laptop computer system, a desktop computer system, a wearable personal electronic device, a tablet computer, and/or any other computing system and/or mobile device that may be used in connection with the disclosed systems and methods. In various embodiments, the device 100 may be configured to authenticate an associated subscriber with and/or connect to an MNO 102 using SIM functionality.

The mobile device 100 may comprise at least one processor. The processor may be configured to implement a variety of device functions including, for example, executing applications, coordinating certain services, and/or the like. In some embodiments, the device 100 and/or processor may further include a secure processing unit ("SPU"), a hardened and/or secure execution space, and/or a trusted execution environment ("TEE") with sufficient trusted and/or secure resources to implement certain more secure functions associated with subscriber authentication and SIM functionality.

Consistent with various aspects of the disclosed embodiments, in connection with various SIM operations, the mobile device 100 may interact with one or more MVNOs 104, MNOs 102, and/or other services such as an activation service (not shown). The MVNOs 104, MNOs 102, other services, and/or mobile device 100 may comprise a variety of types of computing systems, combinations of systems, and/or other associated equipment (e.g., network infrastructure equipment and/or the like). For example, the MVNOs 104, MNOs 102, other services, and/or mobile device 100 may comprise any suitable computing system and/or combination of systems configured to implement embodiments of the systems and methods disclosed herein. In certain embodiments, the MVNOs 104, MNOs 102, other services, and/or mobile device 100 may comprise at least one processor system configured to execute instructions stored on an associated non-transitory computer-readable storage medium.

The MVNOs 104, MNOs 102, other services, and/or mobile device 100 may further comprise systems including a SPU and/or other TEE configured to perform sensitive operations such as trusted credential and/or key management, secure policy management, and/or other aspects of the systems and methods disclosed herein. The MVNOs 104, MNOs 102, other services, and/or mobile device 100 may further comprise software and/or hardware configured to enable electronic communication of information between the devices and/or systems via one or more associated network connections.

In some embodiments, certain communication between the MVNOs 104, MNOs 102, other services, and/or mobile device 100 may be encrypted and/or otherwise secure and/or protected. For example, in some embodiments, e-SIM information 106 communicated from the MNVOs 104 and/or one or more activation services to the mobile device 100 may be encrypted. Certain communications of secure information within devices between various device subsystems may be further protected using suitable encryption and/or secure communication technique(s).

The MVNOs 104, MNOs 102, other services, and/or mobile device 100 may communicate using a network comprising any suitable number of networks and/or network connections. The network connections may comprise a variety of network communication devices and/or channels and may use any suitable communication protocols and/or standards facilitating communication between the connected devices and systems. For example, in some embodiments the network may comprise the Internet, a local area network, a virtual private network, and/or any other communication network utilizing one or more electronic communication technologies and/or standards (e.g., Ethernet and/or the like). In some embodiments, the network connections may comprise a wireless carrier system such as a personal communications system ("PCS"), and/or any other suitable communication system incorporating any suitable communication standards and/or protocols. In further embodiments, the network connections may comprise an analog mobile communications network and/or a digital mobile communications network utilizing, for example, code division multiple access ("CDMA"), Global System for Mobile Communications or Groupe Special Mobile ("GSM"), frequency division multiple access ("FDMA"), and/or time divisional multiple access ("TDMA") standards. In certain embodiments, the network connections may incorporate one or more satellite communication links. In yet further embodiments, the network connections may use IEEE's 802.11 standards, Bluetooth®, ultra-wide band ("UWB"), Zigbee®, and or any other suitable communication protocol(s).

To activate the device with an MNO 102, an MVNO 104 and/or an intermediary service (such as an activation service) may provision the device 100 with unique identification information and/or key information for use in connection with authenticating a subscriber of the device 100 with the MNO 102. In some embodiments, the activation information 106 may comprise identifying information and/or information used in connection with device authentication and/or other cryptographic operations. For example, the device 100 may be provisioned with one or more of an integrated circuit card identifier ("ICCID"), an IMSI, and/or one or more network authentication keys. It will be appreciated that a variety of other types of identifying, authentication, and/or other information may be provisioned to the device 100 and be used to authenticate the device 100 with an MNO 102. Information provisioned to the device 100 by for activating and/or otherwise authenticating the device 100 with an MNO 102 may, in certain instances, be generally referred to herein as subscriber information and/or e-SIM information.

In certain embodiments, an MVNO 104 may provision the device 100 with a plurality of different instances of e-SIM information 106 that may allow a subscriber associated with the device 100 to authenticate with a plurality of different MNOs 102. For example, first e-SIM information provisioned to the mobile device 100 may allow a subscriber of the device 100 to authenticate with a first MNO, and second e-SIM information provisioned to the mobile device 100 may allow the subscriber of the device to authenticate with a second MNO. In further embodiments, different MVNOs, authentication services, and/or associated systems and/or services may provision the device 100 with different e-SIM information for use in authenticating with a plurality of different MNOs 102.

Authentication of the device 100 and/or other SIM-related functionality may be implemented by a software SIM application 108 executing on the mobile device 100. In various embodiments, the software SIM application 108 may coordinate various interactions between the MVNO 104 and/or one or more MNOs 102, manage received e-SIM information 106, and/or perform various operations involved in authenticating a subscriber of the mobile device 100 with an MNO 102.

Consistent with various embodiments, an MVNO 104 may contract with multiple MNOs 102 and may provision a mobile device 100 with multiple instances of e-SIM information 106 associated with the multiple MNOs 102 so that the mobile device 100 may selectively authenticate itself with the multiple MNOs 102. In this manner, embodiments of the disclosed architecture may allow for a mobile device 100 to identify and selectively connect to one of a plurality of MNOs 102.

In some embodiments, the software SIM application 108 may identify and selectively connect to an MNO 102 in accordance with one or more policies 110. The policies may be associated with a mobile device 100, a user and/or subscriber of the mobile device 100, and/or an associated MVNO 104. For example, a user of a mobile device 100 may articulate a policy 110 that prioritizes connectivity with an MNO of available MNOs 102 that has the fastest available network speed and/or highest bandwidth. In another example, a user of a mobile device 100 may articulate a policy that prioritizes connectivity with an MNO of available MNOs 102 that has the lowest available network access costs. It will be appreciated that a variety of types of policies 110, including policies that are associated with multiple variables and/or criteria, may be used in connection with various aspects of the disclosed embodiments, and that any suitable type of policy 110 may be used in connection with the disclosed systems and methods.

Based on the one or more policies 110, the software SIM application 108 may identify a preferred network of the plurality of MNOs 102. Using the provisioned e-SIM information 106 associated with the preferred MNO, the software SIM application 108 may authenticate the device 100 with the identified preferred MNO.

In various embodiments, available connectivity with other MNOs 102 may be checked to determine if a new preferred MNO can be identified based on associated policy 110. For example, available MNOs 102 may be checked periodically, in response to the occurrence of one or more events (e.g., the mobile device changing location, a particular time of day, a particular duration of time expiring since the last check, etc.), in response user input and/or network events, and/or the like, to determine if a new preferred MNO of the plurality of MNOs 102 can be identified based on applicable policy 110. In the event a new preferred MNO is identified, the software SIM application 108 may authenticate the mobile device 100 with the new preferred MNO using associated e-SIM information 106 provisioned to the device 100.

In at least one example, the software SIM application 108 may periodically check and/or otherwise determine the network speed and/or bandwidth availability of networks associated with a plurality of MNOs 102. For example, the software SIM application 108 may upload and/or download test data of a certain size and may determine an average network speed based on the results of such a network testing operation.

Once network speeds associated with the plurality of MNOs 102 have been measured, the software SIM application 108 may compare the measured network speeds against criteria articulated in policies 110 to identify a preferred network from the plurality of MNOs 102. For example, policy criteria may articulate that the software SIM application 108 should identify the MNO with the fastest network as the preferred MNO.

The software SIM application 108 may use e-SIM information 106 provisioned to the device 100 associated with the preferred MNO to authenticate the device 100 and/or an associated subscriber with the preferred MNO. For example, the device 100 may use the associated e-SIM information 106 in connection with a cellular authentication and voice encryption ("CAVE") authentication protocol processes.

Once the device 100 and/or subscriber have been authenticated with the preferred MNO, the device may send and/or receive data and/or voice communications to/from the preferred MNO.

In various embodiments, the software SIM application 108 may run in the background of the mobile device 100 and may continue to assess whether a new preferred MNO can be identified based on associated policy 110. For example, the software SIM application 108 may continue to measure network speeds associated with a plurality of MNOs 102 to identify whether a preferred MNO has changed. If the preferred MNO changes, the software SIM application 108 may switch networks to ensure that the mobile device 108 is authenticated with and/or otherwise uses the fastest available network.

It will be appreciated that a number of variations can be made to the architecture, relationships, and examples presented in connection with FIG. 1 within the scope of the inventive body of work. For example, certain device, system, and/or service functionalities described above may be integrated into a single device, system, and/or service, and/or any suitable combination of devices, systems, and/or services in any suitable configuration. Thus, it will be appreciated that the architecture, relationships, and examples presented in connection with FIG. 1 are provided for purposes of illustration and explanation, and not limitation.

Figure 2:
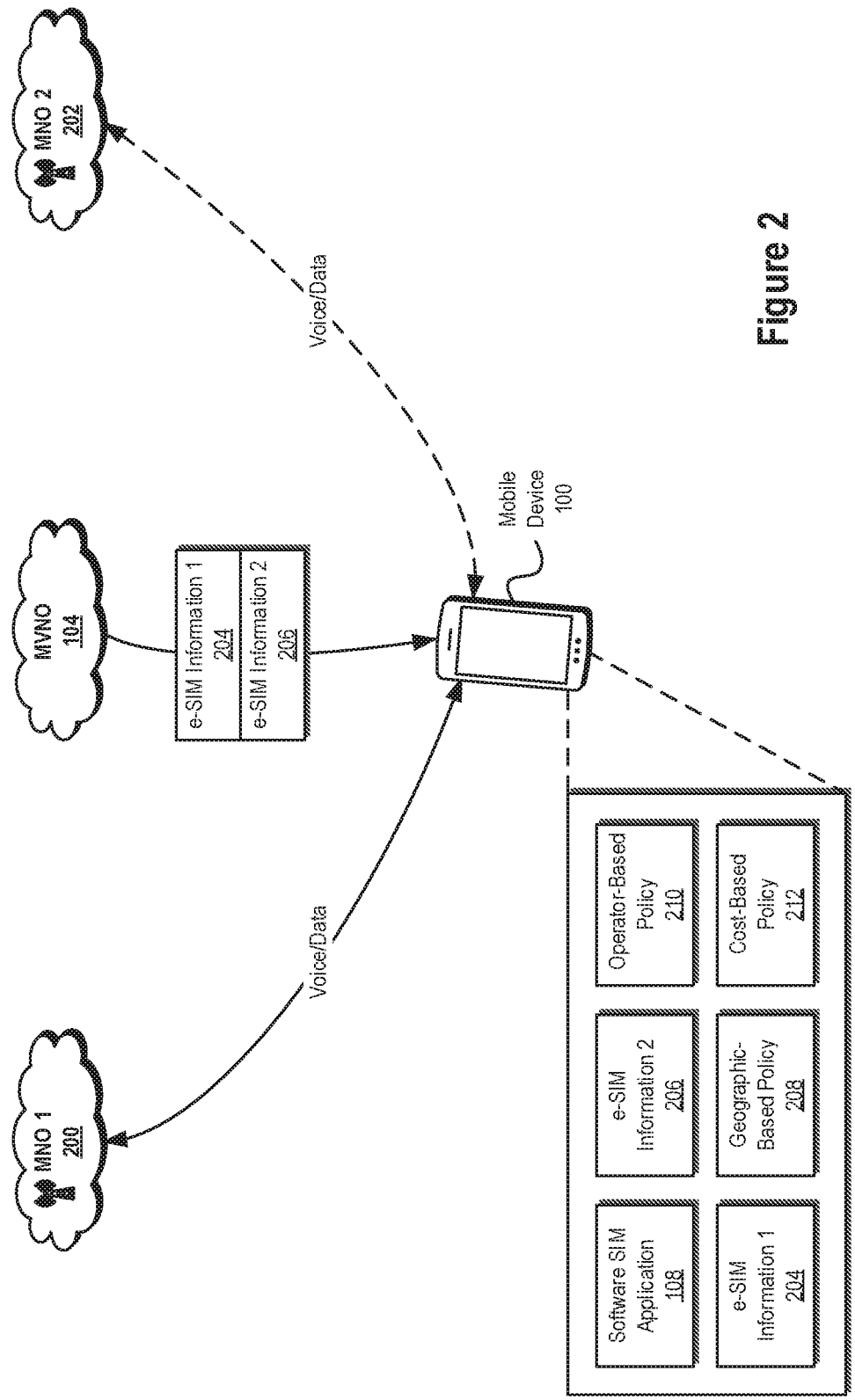
FIG. 2 illustrates an example of a mobile device connecting with a mobile network based on applicable policy consistent with certain embodiments of the present disclosure.

FIG. 2 illustrates an example of a mobile device 100 connecting with a mobile network based on applicable policy consistent with certain embodiments of the present disclosure. As illustrated, a mobile device 100 may be provisioned with subscriber identification information 204, 206 by an MNVO 104. In certain embodiments, the subscriber identification information 204, 206 may comprise e-SIM information that may be used to authenticate a subscriber of the mobile device with a plurality of MNOs 200, 202. For example, e-SIM information 1 204 may allow a subscriber associated with the mobile device 100 to authenticate access to a mobile network associated with MNO 1 200. Similarly, e-SIM information 2 206 may allow the subscriber associated with the mobile device 100 to authenticate access to a mobile network associated with MNO 2 202.

A software SIM application 108 executing on the mobile device 100 may coordinate various interactions between the MVNO 104 and/or MNOs 200, 202, manage received e-SIM information 204, 206, and/or perform various operations involved in authenticating a subscriber of the mobile device 100 with an MNO 200, 202. For example, in some embodiments, the software SIM application 108 may authenticate a subscriber associated with the mobile device 100 with MNO 1 200 using e-SIM information 1 204.

In some embodiments, the mobile device 100 may initially authenticate and/or otherwise connect with MNO 1 200 using e-SIM information 1 204 by default. For example, in various embodiments, MNO 1 200 may be a default MNO of the mobile device 100 (e.g., a default network as articulated by a subscriber and/or user of the mobile device 100). In further embodiments, the mobile device 100 may initially authenticate and/or otherwise connect with MNO 1 using e-SIM information 1 204 based on applicable policy determinations.

In certain embodiments, the software SIM application 108 may check available connectivity with other MNOs (e.g., MNO 2 202) to determine if a new preferred MNO of available MNOs can be identified based on associated policies 208-212. In some embodiments, available MNOs 200, 202 may be may be checked by the mobile device 100 and/or the software SIM application 108 periodically, in response to the occurrence of one or more events, and/or based on contextual information received and/or generated by the device 100 (e.g., the mobile device changing location as determined by device sensors, a particular time of day, a particular duration of time expiring since a prior MNO availability check, etc.), in response user input and/or network events, and/or the like, to determine if a new preferred MNO of the plurality of MNOs 102 can be identified based on applicable policy 110.

A variety of policies 208-212 may be used to select which MNO of a plurality of available MNOs is a preferred MNO including, for example and without limitation, geographic-based policies 208, connection-based policies, cost-based policies 212, temporal-based policies, and/or network operator-based policies 210. As illustrated, in some embodiments, a geographic-based policy 208 may be used to determine whether to connect to and/or authenticate an associated subscriber with MNO 1 200 and/or MNO 2 202. For example, a location sensor of the mobile device 100 (e.g., a global positioning system ("GPS") sensor) may generate contextual information indicating that the mobile device 100 has moved locations and/or is within a particular geographic region (e.g., a particular country, state, and/or the like). Using this contextual information, the mobile device 100 and/or the associated software SIM application 108 may evaluate a geographic-based policy 208 to determine whether the change of location and/or whether the location of the device is associated with a change of preferred MNO in accordance with the geographic-based policy 208.

In further embodiments, an operator-based policy 210 may be used to determine whether the mobile device 100 should connect to and/or authenticate within an associated subscriber with MNO 1 200 and/or MNO 2 202. For example, an operator-based policy 210 may articulate that if MNO 2 202 is available, the mobile device 100 should authenticate and/or otherwise connect with MNO 2 202 over other available MNOs (e.g., MNO 1 200). Accordingly, if the mobile device 100 is connected with MNO 1 200 and MNO 2 202 becomes available, the software SIM application 108 may direct the mobile device 100 to switch networks and authenticate with MNO 2 202 using e-SIM information 2 206.

In additional embodiments, a cost-based policy 212 may be used to determine whether the mobile device 100 should connect to and/or authenticate with an associated subscriber with MNO 1 200 and/or MNO 2 202. For example, a cost-based policy 212 may articulate that the mobile device 100 should authenticate and/or otherwise connect with an available MNO having the least associated network subscriber access costs (e.g., voice and/or data access costs). Accordingly, if the mobile device 100 is connected with MNO 1 200 and MNO 2 202 becomes available and is determined to be associated with lower subscriber access costs, the software SIM application 108 may direct the mobile device 100 to switch networks and authenticate with MNO 2 202 using e-SIM information 2 206.

In the event a new preferred MNO is identified based on one or more applied policies 208-212, the software SIM application 108 may authenticate the mobile device 100 with the new preferred MNO using associated e-SIM information (e.g., e-SIM information 1 204 and/or e-SIM information 206) provisioned to the device 100.

FIG. 3 illustrates an example of mobile network connection policies 110 consistent with certain embodiments of the present disclosure. As illustrated, in certain embodiments, connection policies 110 may include, for example and without limitation, one or more geographic-based policies 208, connection-based policies 300, cost-based policies 212, temporal-based policies 300, and/or operator-based policies 210. It will be appreciated that a variety of types of policies 110, including policies that are associated with multiple variables and/or criteria, may be used in connection with various aspects of the disclosed embodiments, and that any suitable type of policy 110 may be used in connection with the disclosed systems and methods. Thus, it will be appreciated that the policies 110 presented in connection with FIG. 3 are provided for purposes of illustration and explanation, and not limitation.

As illustrated and described above, a geographic-based policy 208 may articulate one or more policy preferences that are associated with a geographic location and/or change in location of a mobile device, which may be determined based on contextual information received from a user and/or generated by the device, one/or more location-sensors associated with the device (e.g., GPS sensors), and/or other sensor and/or information generated and/or received by the device. In some embodiments, a geographic-based policy 208 may specify that a mobile device should authenticate and/or otherwise connect with a specific MNO when a device is located within a defined geographic area (or conversely, outside a defined geographic area). For example, as illustrated, a geographic-based policy 208 may specify that the mobile device connect to a first MNO when the device is located within a first defined geographic area and that the mobile device connect to a second MNO when the device is located within a second defined geographic area. In further embodiments, a geographic-based policy 208 may specify that a device change and/or connect to a particular MNO when the mobile device changes location, changes location by a certain distance, and/or the like.

A connection-based policy 300 may articulate one or more policy preferences that are associated with available network connection parameters. In some embodiments, a connection-based policy 300 may articulate that a mobile device should connect to and/or authenticate with an MNO having certain network connection speed and/or bandwidth parameters. For example, as illustrated, a connection-based policy 300 may articulate that a mobile device should connect to an MNO with the highest download bandwidth, the highest upload bandwidth, the highest combined upload/download bandwidths, and/or the like. In some embodiments, a software SIM application and/or another associated application executing on a device may upload and/or download test data of a certain size and may determine an average network speed based on the results of such a network testing operation for use in connection with connection-based policy 300 determinations.

A cost-based policy 212 may specify one or more policy preferences that are associated with available network connection cost parameters. In some embodiments, a cost-based policy 212 may specify that a mobile device should, for example, authenticate and/or otherwise connect with an available MNO having the least expensive associated network subscriber access costs. For example, as illustrated, a cost-based policy 212 may specify that a device connect to an available MNO with the least expensive voice network access rates, connect to an available MNO with the least expensive data network access rates, connect to an available MNO with the least expensive combined voice and/or data rates, and/or the like.

A temporal-based policy 302 may articulate one or more policy preferences that are associated with temporal conditions. In some embodiments, a temporal-based policy 302 may articulate that a mobile device should connect to and/or authenticate with an MNO during one or more time windows, for a certain duration of time, for a certain duration of time within a defined time window, and/or the like. For example, as illustrated, a temporal-based policy 302 may specify that a device connect to a first MNO during a first time window, connect to a second MNO during a second time window which may be different than the first time window, connect to a first MNO for a certain duration of time and/or a certain duration of time within a time window, and/or the like.

An operator-based policy 210 may articulate one or more policy-preferences that are associated with particular MNOs. For example, as illustrated, an operator-based policy 210 may specify that if a particular MNO is available, the mobile device 100 should designate the MNO as a preferred MNO and attempt to authenticate and/or otherwise connect with the preferred MNO over other available MNOs.

In some embodiments, mobile network connection policies 110 may be associated with particular MNOs. For example, as illustrated, a geographic-based policy 208 may articulate that a device should authenticate and/or otherwise connect with a specific MNO when the device is located within a particular geographic area, a temporal-based policy 302 may specify that a device should authenticate and/or otherwise connect with a specific MNO during certain time windows, an operator-based policy 210 may articulate that a device should authenticate and/or otherwise connect with a specific MNO over other MNOs if the specific MNO is available, and/or the like.

In further embodiments, mobile network connection policies 110 may not necessarily be associated with a particular MNO but be associated with parameters and/or other information associated with available MNOs. For example, a connection-based policy 300 may articulate that a device should authenticate and/or connect with an MNO having certain bandwidth speed parameters and not necessarily specify an associated MNO. Similarly, a cost-based policy 212 may articulate that a device should authenticate and/or connect with an MNO having certain cost-related parameters and not necessarily specify an associated MNO.

It will be appreciated that a variety of types of mobile network connection policies 110, including policies that are associated with multiple variables and/or criteria, may be used in connection with various aspects of the disclosed embodiments, and that any suitable type of policy 110 may be used in connection with the disclosed systems and methods.

In various embodiments, a number of different mobile network connection policies 110 may be applied in connection with MNO authentication determinations consistent with aspects of the disclosed embodiments. For example, multiple policies 110 may be evaluated consistent with embodiments disclosed herein to identify a preferred MNO from a plurality of available MNOs.

In some embodiments, policies 110 may be hierarchical in nature. That is, certain policies 110 may be determinative and/or more determinative in connection with identifying a preferred MNO from available MNOs. In yet further embodiments, a preferred MNO may be identified based the preferred MNO meeting conditions of a threshold number of applicable policy conditions and/or the meeting the most policy conditions relative to other available MNOs.

As detailed above, policies 110 may be used to determine which MNO of a plurality of available MNOs is a preferred MNO in connection with subscriber authentication and/or network authentication processes. In further embodiments, policies 110 may be further used to determine and/or otherwise trigger when such a preferred MNO determination is made. For example, a mobile device may initiate a preferred MNO determination process consistent with aspects of the disclosed embodiments in response to receiving and/or generating contextual information (e.g., sensor information, user inputs, network connectivity changes, and/or the like) associated with one or more conditions articulated in one or more policies 110.

Figure 4:
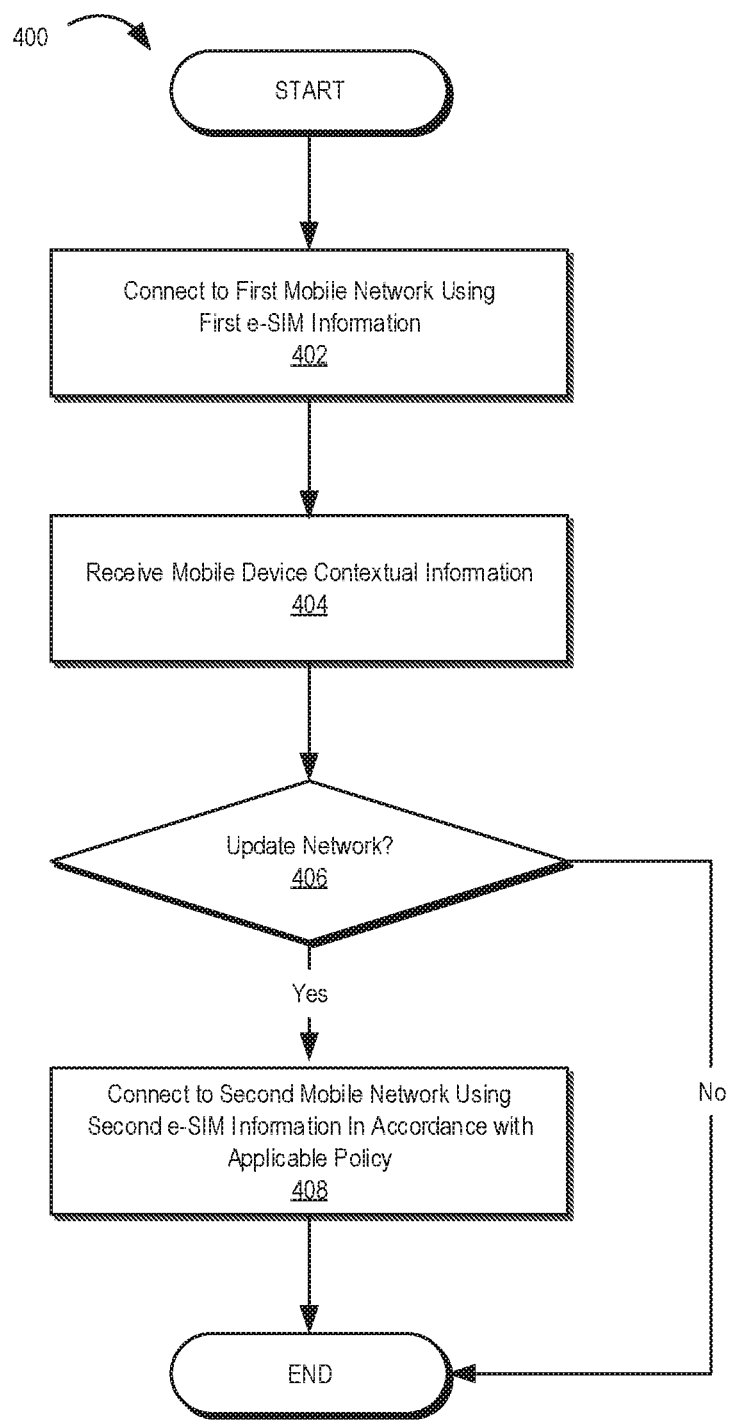
FIG. 4 illustrates a flow chart of an example of a method for connecting to a mobile network based on applicable policy consistent with certain embodiments of the present disclosure.

FIG. 4 illustrates a flow chart of an example of a method 400 for connecting to a mobile network based on applicable policy consistent with certain embodiments of the present disclosure. The illustrated method 400 may be implemented in a variety of ways, including using software, firmware, hardware, and/or any combination thereof. In certain embodiments, various aspects of the method 400 and/or its constituent steps may be performed by a user device, a software SIM application executing on a user device, and/or any other suitable systems and/or services or combination of systems and/or services.

At 402, a mobile device may authenticate with and/or otherwise connect to a first mobile network using first e-SIM information provisioned to the device. The first e-SIM information may comprise identifying information and/or information used in connection with device authentication and/or other cryptographic operations with a first mobile network. For example, the first e-SIM information may comprise one or more of an ICCID, an IMSI, and/or one or more network authentication keys associated with the first mobile network. In some embodiments, the mobile device may connect to the first mobile network based on determining that the first mobile network is a preferred mobile network in connection with mobile network connection policies as described herein.

Contextual information may be received and/or generated by the mobile device at 404. In some embodiments, the contextual information may be associated with one or more conditions specified by mobile network access policies associated with the mobile device. Contextual information may include, for example and without limitation, sensor information generated by sensors associated with the mobile device (e.g., location information generated by one or more device location sensors and/or the like), user input information provided to mobile device, network connectivity and/or availability information generated and/or received by the mobile device (e.g., indications of available networks, available network upload and/or download bandwidth, and/or the like), and/or other available information relevant to mobile network access policy determinations generated and/or received by the mobile device (e.g., clock information and/or the like).

At 406, relevant policies may be applied based on the received and/or generated contextual information and a determination may be made regarding whether the mobile device should change and/or otherwise update network connectivity based on the applied policies. In some embodiments, the policy determination at 406 may be triggered based on receipt of the contextual information at 404. In further embodiments, the policy determination at 406 may be triggered periodically and/or after the expiration of a certain period of time following a prior policy determination process.

If the policy determination at 406 indicates that the mobile device should remain connected to the first mobile network, the method 400 may proceed to terminate. If, however, the policy determination at 406 indicates that the mobile device should connect to a different preferred mobile network, the method 400 may proceed to 408 where the mobile device may authenticate with and/or otherwise connect to a second mobile network using second e-SIM information provisioned to the device. The second e-SIM information may comprise identifying information and/or information used in connection with device authentication and/or other cryptographic operations with the second mobile network. For example, the second e-SIM information may comprise one or more of an ICCID, an IMSI, and/or one or more network authentication keys associated with the second mobile network.

Figure 5:
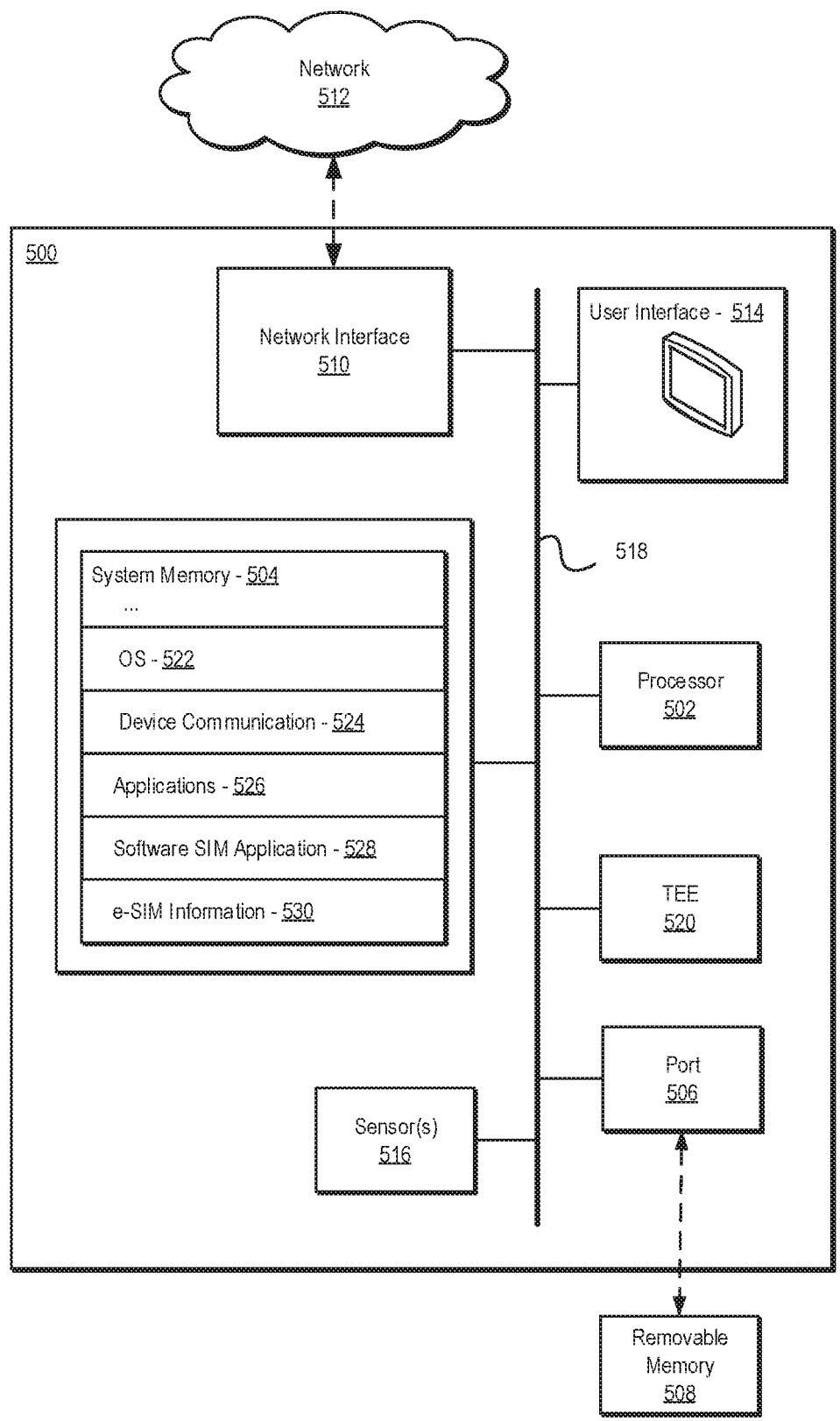
FIG. 5 illustrates an example of a system that may be used to implement certain embodiments of the systems and methods of the present disclosure.

FIG. 5 illustrates an example of a system 500 that may be used to implement certain embodiments of the systems and methods of the present disclosure. Certain elements associated with the illustrated system 500 may be included in a mobile device, an activation service, an MNO, an MVNO, and/or any other system or service configured to implement aspects of the embodiments of the systems and methods disclosed herein.

As illustrated in FIG. 5, the system 500 may include: a processing unit 502; system memory 504, which may include high speed random access memory ("RAM"), non-volatile memory ("ROM"), and/or one or more bulk non-volatile non-transitory computer-readable storage mediums (e.g., a hard disk, flash memory, etc.) for storing programs and other data for use and execution by the processing unit 502; a port 506 for interfacing with removable memory 508 that may include one or more diskettes, optical storage mediums, and/or other non-transitory computer-readable storage mediums (e.g., flash memory, thumb drives, USB dongles, compact discs, DVDs, etc.); a network interface 510 for communicating with other systems via one or more network connections 512 using one or more communication technologies; a user interface 514 that may include a display and/or one or more input/output devices such as, for example, a touchscreen, a keyboard, a mouse, a track pad, and the like; one or more sensors 516 (e.g., location sensors, network connectivity sensors, and/or the like); and/or one or more busses 518 for communicatively coupling the elements of the system 500.

In some embodiments, the system 500 may include a TEE 520 that is protected from tampering by a user of the system 500 or other entities by utilizing secure physical and/or virtual security techniques. The TEE 520 can help enhance the security of sensitive operations such as device and/or subscriber authentication with a wireless network operator and/or carrier, trusted credential and/or key management, privacy and policy management, and other aspects of the systems and methods disclosed herein. In certain embodiments, the TEE 520 may operate in a logically secure processing domain and be configured to protect and operate on secret information, as described herein. In some embodiments, the TEE 520 may include internal memory storing executable instructions or programs and/or other information configured to enable the TEE 520 to perform secure SIM and/or authentication operations, as described herein.

The operation of the system 500 may be generally controlled by the processing unit 502 and/or the TEE 520 operating by executing software instructions and programs stored in the system memory 504 and/or internal memory of the TEE 520 (and/or other computer-readable media, such as removable memory 508). The system memory 504 may store a variety of executable programs and/or modules for controlling the operation of the system 500. For example, the system memory may include an operating system ("OS") 522 that may manage and coordinate, at least in part, system hardware resources and provide for common services for execution of various applications.

The system memory 504 may further include, without limitation, communication software 524 configured to enable in part communication with and by the system 500; one or more applications 526; various information and/or executable modules associated with a software SIM application 528 and/or e-SIM information 530 consistent with various disclosed embodiments; and/or any other information and/or applications configured to implement embodiments of the systems and methods disclosed herein.

The systems and methods disclosed herein are not inherently related to any particular computer, device, service, or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network. Software embodiments may be implemented as a computer program product that comprises a non-transitory storage medium configured to store computer programs and instructions, that when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, an optical storage medium, flash memory, integrated circuits, or any other non-transitory digital processing apparatus memory device.

Although the foregoing has been described in some detail for purposes of clarity, it will be apparent that certain changes and modifications may be made without departing from the principles thereof. It should be noted that there are many alternative ways of implementing both the systems and methods described herein. Accordingly, the present embodiments are to be considered as illustrative and not restrictive, and the invention is not to be limited to the details given herein, but may be modified within the scope and equivalents of the appended claims.

What is claimed is:

1. A method for managing network connectivity performed by a mobile device comprising a processor and a non-transitory computer-readable medium storing instructions that, when executed by the processor, cause the system to perform the method, the method comprising:
    receiving first electronic subscriber information comprising information configured to authenticate the mobile device with a first mobile network and second electronic subscriber information comprising information configured to authenticate the mobile device with a second mobile network;
    authenticating a network connection between the first mobile network and the mobile device using the first electronic subscriber information;
    generating, by a location sensor system of the mobile device, first contextual information, the first contextual information comprising location information indicating a location of the mobile device;
    determining, based on the first contextual information and prior device location information, that the location of the mobile device has changed;
    determining, in response to determining that the location of the mobile device has changed, that the second mobile network is available to the mobile device;
    determining, in response to determining that the second mobile network is available to the mobile device, based, at least in part, on the first contextual information and one or more network access policies managed by the mobile device, that the second mobile network is a preferred mobile network in accordance with the one or more mobile network access policies; and
    authenticating a network connection between the second mobile network and the mobile device using the second electronic subscriber information in response to determining that the second mobile network is the preferred mobile network.

2. The method of claim 1, wherein the first subscriber information is received from a first virtual mobile network operator system.

3. The method of claim 2, wherein the second subscriber information is received from a second virtual mobile network operator system different from the first virtual mobile network operator system.

4. The method of claim 2, wherein the second subscriber information is received from the first virtual mobile network operator system.

5. The method of claim 1, wherein determining that the second mobile network is a preferred mobile network is further based on second contextual information.

6. The method of claim 5, wherein the second contextual information is generated by the mobile device.

7. The method of claim 5, wherein the second contextual information is received by the mobile device.

8. The method of claim 5, wherein the second contextual information comprises at least one of mobile network download bandwidth information, mobile network upload bandwidth information, mobile network access cost information, and time information.

9. The method of claim 1, wherein determining that the second mobile network is a preferred mobile network comprises determining that the second mobile network is associated with higher upload speeds than the first mobile network.

10. The method of claim 1, wherein determining that the second mobile network is a preferred mobile network comprises determining that the second mobile network is associated with higher download speeds than the first mobile network.

11. The method of claim 1, wherein determining that the second mobile network is a preferred mobile network comprises determining that the second mobile network is associated with higher combined upload and download speeds than the first mobile network.

12. The method of claim 1, wherein determining that the second mobile network is a preferred mobile network comprises determining, based on the first contextual information, that the mobile device is located within a particular geographic region.

13. The method of claim 1, wherein determining that the second mobile network is a preferred mobile network comprises determining that the second mobile network is associated with lower network access costs than the first mobile network.

14. The method of claim 1, wherein determining that the second mobile network is a preferred mobile network comprises determining that the mobile device has been connected to the first mobile network for a particular duration of time.

\* \* \* \* \*